US009485525B1

(12) United States Patent
Oztaskent et al.

(10) Patent No.: US 9,485,525 B1
(45) Date of Patent: Nov. 1, 2016

(54) SYSTEMS AND METHODS FOR USING CLOSED CAPTIONS FOR TELEVISION VIEWERSHIP MEASUREMENT

(71) Applicant: Google Inc., Mountain View, CA (US)

(72) Inventors: Ant Oztaskent, Sutton Surrey (GB); Yaroslav Volovich, Cambridge (GB); Simon Michael Rowe, London (GB); Cihat Basol, London (GB); James Robert Stewart, London (GB)

(73) Assignee: Google Inc., Mountain View, CA (US)

( * ) Notice: Subject to any disclaimer, the term of this patent is extended or adjusted under 35 U.S.C. 154(b) by 286 days.

(21) Appl. No.: 14/253,028

(22) Filed: Apr. 15, 2014

(51) Int. Cl.
*H04H 60/32* (2008.01)
*H04N 21/234* (2011.01)
*H04N 21/258* (2011.01)

(52) U.S. Cl.
CPC .. *H04N 21/23418* (2013.01); *H04N 21/25883* (2013.01)

(58) Field of Classification Search
USPC .............................................. 725/20, 34, 53
See application file for complete search history.

(56) References Cited

U.S. PATENT DOCUMENTS

| 4,857,999 A | 8/1989 | Welsh |
| 5,374,951 A | 12/1994 | Welsh |
| 2007/0192782 A1* | 8/2007 | Ramaswamy ............ 725/9 |
| 2007/0294729 A1* | 12/2007 | Ramaswamy ............ 725/53 |
| 2011/0234900 A1 | 9/2011 | Quan |

FOREIGN PATENT DOCUMENTS

| EP | 2 315 378 A2 | 4/2011 |
| WO | WO-2007/146876 A2 | 12/2007 |

OTHER PUBLICATIONS

International Search Report and Written Opinion mailed Jul. 3, 2015 in PCT Application No. PCT/US2015/025185.

* cited by examiner

*Primary Examiner* — Jivka Raboyianski
(74) *Attorney, Agent, or Firm* — Foley and Lardner LLP; John D. Lanza

(57) ABSTRACT

To provide audience measurement services without requiring broadcasters to install additional watermarking equipment, a small video capture device may receive a video signal viewed by an audience member, the signal including embedded closed captioning data, and may decode and transmit the closed captioning data to an audience measurement server. The measurement server may receive the data and compare the received data to a database of closed captioning text to identify matches. The database may be populated via one or more additional capture devices receiving local or national broadcast signals, or with data separately provided by broadcasters. When a match is found, the measurement server may determine that the audience member is watching a program having the corresponding closed captioning. Dynamically generated confidence scores may allow for reliable identification of audience members of content, even with very short closed captioning data lengths.

16 Claims, 9 Drawing Sheets

SYSTEMS AND METHODS FOR USING CLOSED CAPTIONS FOR TELEVISION VIEWERSHIP MEASUREMENT

BACKGROUND

Audiences for content blocks, such as broadcast media or online streamed media, including commercial advertising, are typically measured via single-source data panels consisting of individuals or households recording content exposure over time. In one typical system, panel members carry a portable pager-sized device with a microphone that listens for embedded subaudible codes or watermarks in audio of media programs. The device records the codes it hears, indicating that the panel member was present while the program was being shown or played. The device periodically transmits its logs to a measurement server, which aggregates logs from a plurality of the devices to determine a total viewership for the program.

As the codes or watermarks used by these devices must be inaudible or psychoacoustically concealed within the program, error rates are high and bitrates of data are very low. The device must listen to the audio signal for a substantial duration to be able to collect a complete code, reducing its effectiveness for short programs. Additionally, because codes must be embedded into the audio signal by the broadcaster, each broadcast station or cable provider must have an encoder in the signal chain, increasing cost and providing a potential source of failure.

SUMMARY

Federal Communications Commission (FCC) regulations require all United States broadcasters to provide closed captioning for television programs. In analog television broadcasts compliant with National Television System Committee (NTSC) standards, closed captioning is encoded into line 21 of the vertical blanking interval in EIA-608 format, developed by the Electronic Industries Alliance (EIA), and frequently referred to as "line 21 captioning". For digital television broadcasts compliant with Advanced Television System Committee (ATSC) standards, closed captioning is provided via three encoded streams, two of which provide backward compatibility with NTSC decoders, the third providing up to 63 additional captioning streams encoded in EIA-708 format (sometimes referred to as "CEA-708" format). As the closed captioning is content-specific, the encoded text may be used to identify specific programs being watched by a viewer, and accordingly may be used for audience measurement via the systems and methods disclosed herein. Because each broadcaster already is generating and embedding the captioning, these systems and methods do not require any additional encoders to be installed at stations or cable providers.

In some implementations, a small monitor or capture device may be installed at a participating panel member's home or other viewing location, and may receive the NTSC and/or ATSC video signal from a cable or HDTV decoder, set top box, digital video recorder (DVR), receiver, television output, or other such source. The capture device may decode the closed captioning signal (e.g. the encoded line 21 signal and/or embedded EIA-708 streams), and may transmit the decoded text or a hash of the decoded text to an audience measurement server.

The measurement server may receive the text or hash from the capture device and compare the received data to a database of closed captioning text to identify matches. The database may be populated via one or more additional capture devices receiving local or national broadcast signals, or with data separately provided by broadcasters. When a match is found, the measurement server may determine that the panel member is watching a program having the corresponding closed captioning. Matching may be performed using very short windows, as small as 8 words or less, allowing quick identification of programming, including identification of interstitial advertising during longer programming. Comparisons need not be perfect, but may be identified as matching if the match rate exceeds a threshold. For example, if the database is populated via a national feed of a program, and a panel member's monitor receives a signal including local advertising, the closed captioning may match during the program but not match during commercials. In such situations, larger matching windows may be used, or confidence measures or hysteresis may be applied such that the measurement server may still identify the panel member as watching the program. These systems and methods may be used with time-shifted content or content recorded and played via a DVR or by other such devices, as well as on-demand, streamed, or downloaded content, provided line 21 or EIA-708 captioning is implemented.

One implementation disclosed herein is a method for audience measurement. The method includes receiving, by an audience measurement engine executed by a processor of a first device, from a remote device, a first identification of closed captioning data received by the remote device during playback of an item of content. The method also includes matching, by the audience measurement engine, the first identification of closed captioning data received by the remote device to a second identification of closed captioning data stored in a database in a storage device of the first device. The method further includes retrieving, by the audience measurement engine, an identification of the item of content associated in the database with the second identification of closed captioning data, responsive to the match. The method also includes adding, by the audience measurement engine, a device identifier of the remote device to an audience list of the identified item of content stored in the storage device.

In some implementations of the method, the first identification of closed captioning data comprises closed captioning text. In other implementations of the method, the first identification of closed captioning data comprises a hash of closed captioning text. In one implementation, the method includes receiving, by the audience measurement engine, a second identification of closed captioning data received by a second device; and adding the second identification of closed captioning data to the database. In a further implementation, the second device is operated on behalf of the audience measurement engine. In another further implementation, the method includes receiving an identification of the item of content, associated with the second identification of closed captioning data; and adding the identification of the item of content to the database with the second identification of closed captioning data.

In some implementations, the method includes calculating a hash of the first identification of closed captioning data; and identifying, within the database, an entry identifying an item of content at an index corresponding to the calculated hash, the index equal to a result of a hash of the second identification of closed captioning data. In other implementations, the method includes receiving, by the audience measurement engine from the remote device, a second identification of closed captioning data received by the remote device during playback of the item of content. The method also includes matching, by the audience measurement engine, the second identification of closed captioning data received by the remote device to a third identification of closed captioning data stored in the database. The method also includes retrieving, by the audience measurement engine, the identification of the item of content associated in the database with the third identification of closed captioning data, responsive to the match. The method further includes determining, by the audience measurement engine, that the device identifier of the remote device is included in the audience list of the identified item of content; and increasing, by the audience measurement engine, a confidence score associated with the device identifier of the remote device in the audience list of the identified item of content. In a further implementation, the method includes decreasing, by the audience measurement engine, the confidence score associated with the device identifier of the remote device in the audience list of the identified item of content, responsive to not matching an identification of closed captioning data received by the remote device to a corresponding identification of closed captioning data associated with the item of content stored in the database within a predetermined time period. In another further implementation, the method includes incrementing, by the audience measurement engine, an audience measurement counter for the item of content for each device identifier included in the audience list of the identified item of content having a confidence score greater than a threshold.

Another implementation disclosed herein is a system for audience measurement, including a capture device, comprising a video input, a closed captioning decoder connected to the video input, and a first network interface for transmitting a first identification of closed captioning data received by the capture device during playback of an item of content to an audience measurement server. The system also includes an audience measurement server comprising a processor executing a measurement engine, and a second network interface for receiving the identification of closed captioning data. The measurement engine is configured for matching the first identification of closed captioning data received by the capture device to a second identification of closed captioning data stored in a database in a storage device of the audience measurement server. The measurement engine is also configured for retrieving an identification of the item of content associated in the database with the second identification of closed captioning data, responsive to the match, and adding a device identifier of the capture device to an audience list of the identified item of content stored in the storage device.

In some implementations of the system, the first identification of closed captioning data comprises closed captioning text. In other implementations of the system, the first identification of closed captioning data comprises a hash of closed captioning text. In some implementations, the measurement engine is further configured for receiving a second identification of closed captioning data received by a second capture device; and adding the second identification of closed captioning data to the database. In a further implementation, the second capture device is operated on behalf of the audience measurement engine. In another further implementation, the measurement engine is further configured for receiving an identification of the item of content, associated with the second identification of closed captioning data, and adding the identification of the item of content to the database with the second identification of closed captioning data.

In some implementations, the measurement engine is further configured for calculating a hash of the first identification of closed captioning data, and identifying, within the database, an entry identifying an item of content at an index corresponding to the calculated hash, the index equal to a result of a hash of the second identification of closed captioning data. In other implementations, the measurement engine is further configured for receiving, from the capture device, a second identification of closed captioning data received by the remote device during playback of the item of content; and matching the second identification of closed captioning data received by the capture device to a third identification of closed captioning data stored in the database. The measurement engine is also configured for retrieving the identification of the item of content associated in the database with the third identification of closed captioning data, responsive to the match. The measurement engine is further configured for determining that the device identifier of the capture device is included in the audience list of the identified item of content; and increasing a confidence score associated with the device identifier of the capture device in the audience list of the identified item of content. In a further implementation, the measurement engine is further configured for decreasing the confidence score associated with the device identifier of the capture device in the audience list of the identified item of content, responsive to not matching an identification of closed captioning data received by the capture device to a corresponding identification of closed captioning data associated with the item of content stored in the database within a predetermined time period. In another further implementation, the measurement engine is further configured for incrementing, by the audience measurement engine, an audience measurement counter for the item of content for each device identifier included in the audience list of the identified item of content having a confidence score greater than a threshold.

Also disclosed herein is an implementation of a computer-readable storage medium storing instructions that when executed by one or more data processors, cause the one or more data processors to perform operations including receiving, from a remote device, a first identification of closed captioning data received by the remote device during playback of an item of content. The operations also include matching the first identification of closed captioning data received by the remote device to a second identification of closed captioning data stored in a database in a storage device. The operations further include retrieving an identification of the item of content associated in the database with the second identification of closed captioning data, responsive to the match; and adding a device identifier of the remote device to an audience list of the identified item of content stored in the storage device.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Measurement of an audience of content, such as television programming, movies, commercial advertising, or any other type and form of content, may be useful for measuring audience size or popularity of content for pricing and selling advertisement placements, planning content delivery schedules, or other such purposes. In traditional terrestrial or satellite broadcasting, a provider may not have direct knowledge of the number of receivers tuned in at any time, due to the lack of a back channel or communication pathway from the receiver to the provider. To overcome this limitation, some audience measurement systems have used panels of participating individuals who agree to fill out surveys or diaries of content they've seen or listened to. However, this system relies on self-reporting, which may have decreased accuracy. Another system requires panel participants to wear or carry a portable device that detects content played back in the vicinity via subaudible audio watermarks or codes, and records a log for subsequent transmission to the panel provider. However, this system requires watermarking encoders to be installed at every broadcast source to be measured as part of the signal chain, increasing expense and failure rates. Additionally, embedded codes may be distorted or corrupted when data compression is applied, such as in digital video recorders or other systems.

Many broadcasters, including all television broadcasters in the United States, already provide closed captioning for broadcast television programs, including programs delivered via terrestrial or satellite broadcasts, cable broadcasting, video-on-demand systems, or Internet streaming. Many of these systems include closed captioning data encoded in EIA-608 and/or EIA-708 formats within the video signal, format. The closed captioning data is content-specific, and accordingly may be used to identify specific programs being watched by a viewer for audience measurement.

Figure 1A:
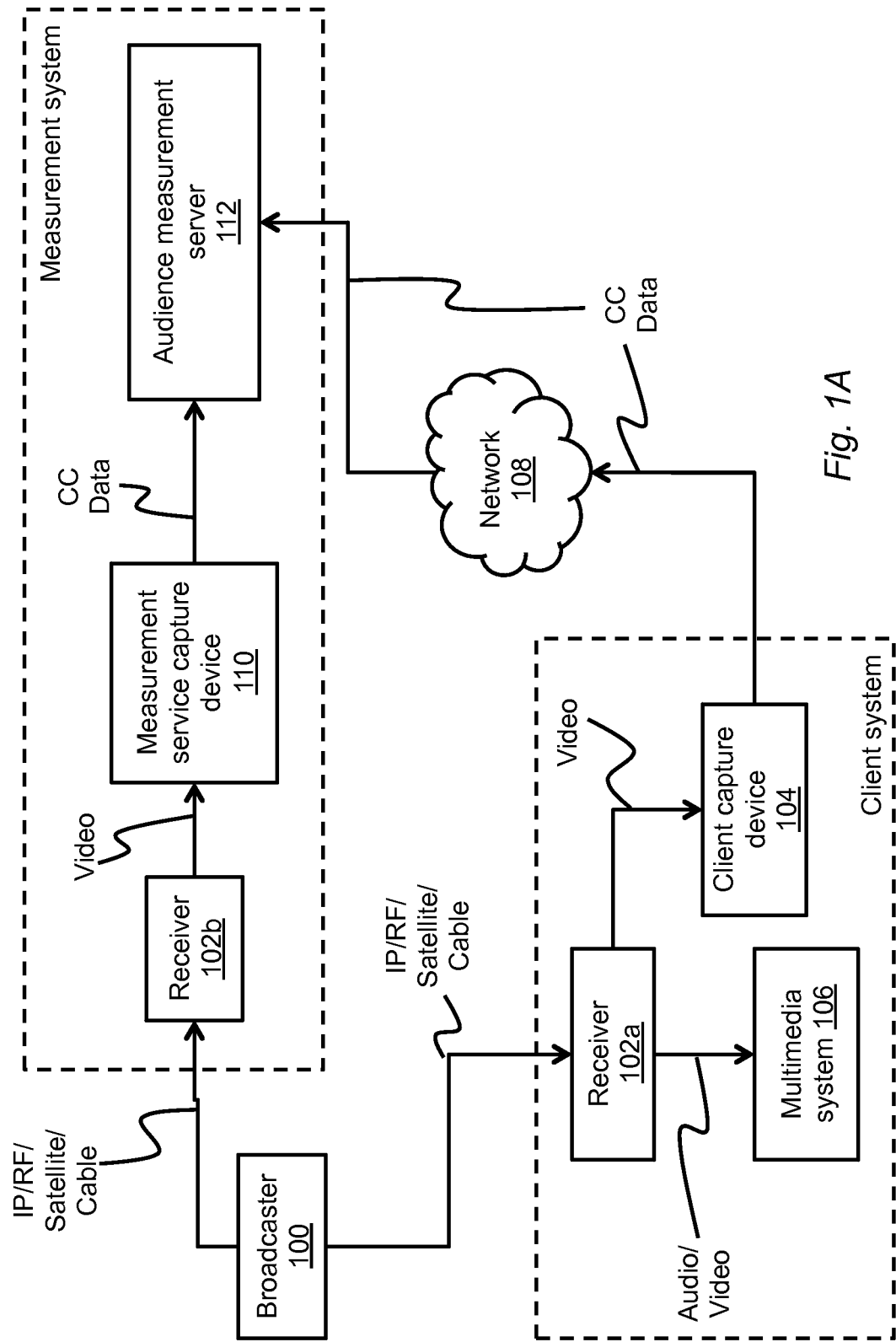
FIG. 1A is a diagram of a system for using closed captions for audience measurement, according to one implementation.

FIG. 1A is a diagram of a system for using closed captions for audience measurement, according to one implementation. As shown, a broadcaster 100 may deliver content to client systems via satellite or terrestrial radio frequency (RF) broadcasts, cable systems, or via Internet protocols (IP) such as streamed or downloaded content, VOD systems, or other such systems. Although shown as a single entity, in many instances, a broadcaster 100 may comprise a broadcast source such as a national broadcast network source, a regional or local network affiliate that receives and redistributes the network source (sometimes with additional local or regional-specific content), a cable broadcast provider, an Internet service provider (ISP), or other various affiliated and non-affiliated entities.

Content may be received by a client system at a receiver 102a, which may comprise an antenna or satellite dish and demodulator or decoder, a cable receiver, a digital television (DTV) decoder, a set top box, a DVR, a computing device, or any other type and form of device for receiving content with closed captioning data. The receiver 102a may be connected to a multimedia system 106, such as a television, home theater system, or any other type and form of device for displaying audio and/or video content received and decoded by a receiver 102a. In some implementations, the receiver 102a and multimedia system 106 may be combined, as in many televisions with attached antennas or included cable demodulators, "smart" or Internet-attached televisions, or other such devices.

In some implementations, a small monitoring or capture device 104 may be installed or deployed at a participating panel member's home or other viewing location, and may receive a video signal including closed captioning data (e.g. an ATSC or NTSC video signal with embedded closed captioning) from a receiver 102a and/or multimedia system 106 (e.g. cable or HDTV decoder, set top box, DVR, television output, multimedia receiver or switcher output, or other such source). For example, in one implementation, the capture device 104 may be physically wired to the receiver 102a or multimedia system 106, while in other implementations, the capture device 104 may wirelessly receive the video signal including closed captioning data. For example, in one such implementation, the receiver 102a and/or multimedia system 106 may include a wireless transmitter streaming video content to a display (such as a Bluetooth connection to a projector, or other such system). In such implementations, the capture device 104 may also receive the transmitted video signal. In other implementations, the capture device 104 may comprise a receiver 102a and may receive transmissions directly such as terrestrial broadcast television signals. In some such implementations, the capture device 104 may be portable, and may be carried by the participating panel member. Accordingly, "installation" or "deployment" of the capture device 104 may refer to physical installation, or may refer to the capture device 104 being in a location to receive a video signal with closed captioning data. In any of these implementations, the capture device 104 may decode the closed captioning signal (e.g. the encoded line 21 signal and/or embedded EIA-708 streams), and in some implementations, may transmit the decoded text or a hash of the decoded text to an audience measurement server 112 (discussed in more detail below) via a network 108.

Network 108 may be any form of computer network or combinations of networks that relay information between one or more client capture devices 104, and one or more audience measurement servers 112, as well as other devices not illustrated. For example, network 108 may include the Internet and/or other types of data networks, such as a local area network (LAN), a wide area network (WAN), a cellular network, satellite network, or other types of data networks. Network 108 may also include any number of computing devices (e.g., computer, servers, routers, network switches, etc.) that are configured to receive and/or transmit data within network 108. Network 108 may further include any number of hardwired and/or wireless connections. For example, a client device 104 may communicate wirelessly (e.g., via WiFi, cellular, radio, etc.) with a transceiver that is hardwired (e.g., via a fiber optic cable, a CAT5 cable, etc.) to other computing devices in network 108. In some implementations, a network 108 may be a virtual network, such as a virtual network between a plurality of virtual machines executed by a single physical machine, or a abstract network such as an offline transfer of data via physically movable media (e.g. a Sneakernet, transferring data via tape media, CD-ROM, flash media, external hard drives, floppy disks, etc.). For example, in one such implementation, a client device 104 may capture and store closed captioning information for subsequent transfer to a computing device via a universal serial bus (USB) or similar interface to be transmitted by said computing device via a network 108.

As shown, in some implementations, a measurement system may also include a receiver 102b, which may be similar to a receiver 102a at a client system. Receiver 102b may receive content from a broadcaster 100 via terrestrial or satellite broadcast, cable system, Internet, or any other such means, and may output video to a measurement service capture device 110. In some implementations, a receiver 102b may be in the same geographical region as a receiver 102a. For example, at least one receiver 102b may be deployed in each city including one or more panel members to capture the same broadcast from a local broadcaster 100. In other implementations, a receiver 102b may be deployed elsewhere, and may receive a similar, but different broadcast. For example, a receiver 102b may receive a national network broadcast via a cable system, while a receiver 102a may receive a terrestrial broadcast from a local affiliate of the national network broadcaster. Such local affiliate broadcasts may include similar content, but may have different interstitial advertising, local newscasts, or other inserted or modified content. Although only one receiver 102b is illustrated, in some implementations, a plurality of receivers 102b may be deployed at a location; e.g. one per broadcaster to be measured. In other implementations, a receiver 102b may have a plurality of tuners, demodulators, or sub-receivers and may be able to receive and output a plurality of broadcasts simultaneously to a corresponding plurality of measurement service capture devices 110.

The measurement system may include one or more measurement service capture devices 110, similar to a client capture device 104. The capture device 110 may decode the closed captioning signal (e.g. the encoded line 21 signal and/or embedded EIA-708 streams), and in some implementations, may transmit the decoded text or a hash of the decoded text to an audience measurement server 112. The transmission may be via a network 108, an internal or local network, or via another interface. For example, the measurement service capture device 110 may include a USB, Bluetooth, or serial output for connection to a corresponding input device of an audience measurement server 112.

Although shown grouped in a measurement system, in some implementations, a receiver 102b need not be located in geographic proximity to a measurement service capture device 110 and/or an audience measurement server 112. For example, a receiver 102b may communicate with a measurement service capture device 110 via a network 108, such as the Internet; and/or a measurement service capture device 110 may communicate via a network 108 with an audience measurement server 112. For example, in one implementation, a receiver 102b and/or measurement service capture device 110 may be deployed at a broadcast transmission site or studio and receive a pre-transmitter video feed or a feed from a monitoring receiver at the site or studio, and may transmit decoded closed captioning data to the audience measurement server 112 via a network 108.

An audience measurement server 112 may comprise one or more computing devices, servers, desktop computers, rack mount computers, workstations, or other devices for receiving closed captioning data from client capture devices 104 and measurement service capture devices 110 and for correlating or matching the received data to determine if devices 104, 110 received the same content at a particular time. In some embodiments, an audience measurement server 112 may be a virtual machine or machines executed by one or more physical machines, such as in a cloud service or server farm. Audience measurement servers 112 may be located in proximity to measurement service capture devices 110, or may be remote from one or more measurement service capture devices 110 and may communicate with the devices over a network 108.

Figure 1B:
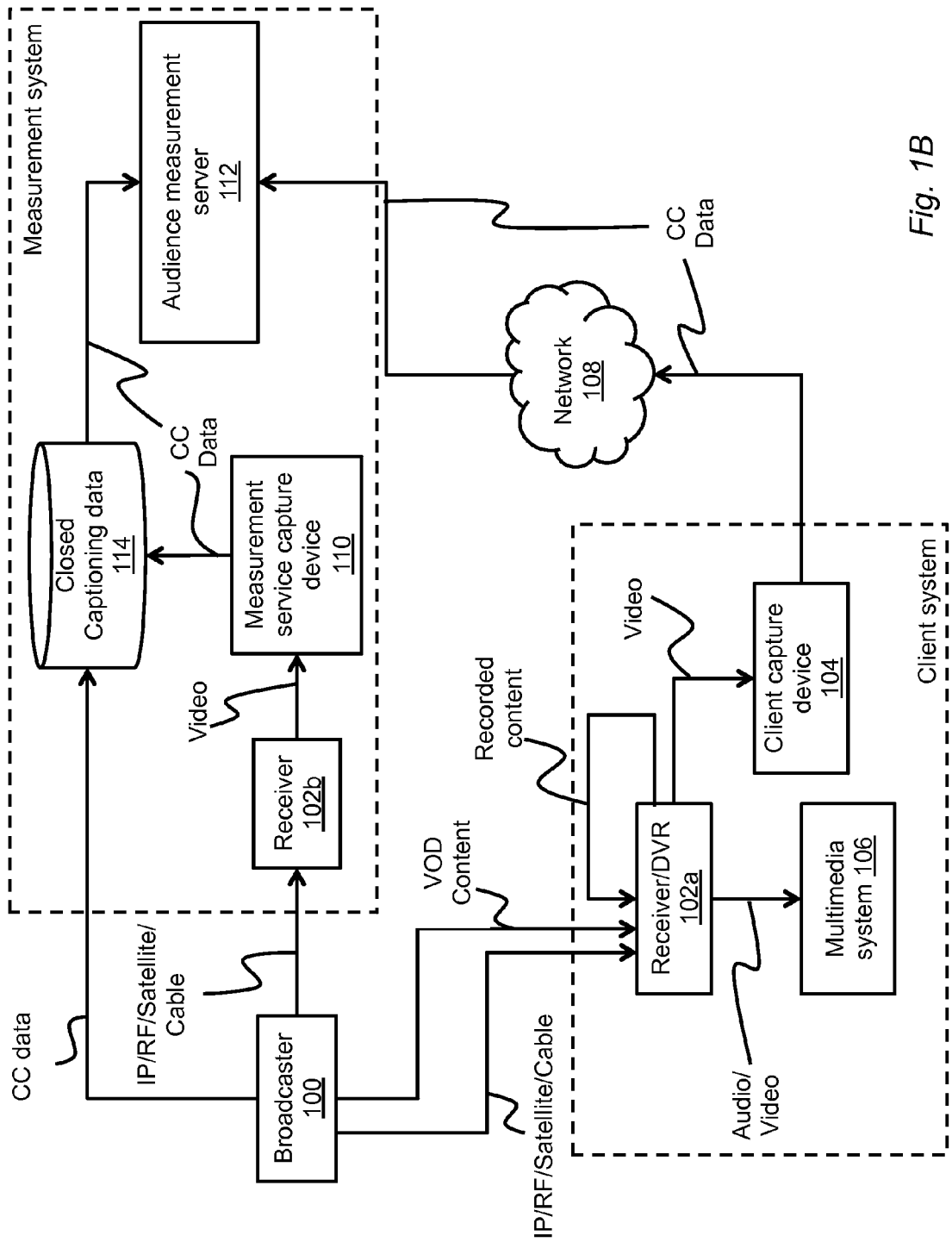
FIG. 1B is a diagram of a another system using closed captions for audience measurement, according to one implementation.

FIG. 1B is a diagram of a another system using closed captions for audience measurement, according to one implementation. Similar to the system shown in FIG. 1A, a client system or receiver 102a may receive content from a broadcaster via satellite or terrestrial broadcast, cable system, or streamed or downloaded via a network. In some implementations, the receiver 102a may include or connect to a digital video recorder (DVR), which may allow time-shifting and/or replay of received content. In other implementations, the receiver 102a may also receive video-on-demand (VOD) comment, or content selected by a user for streaming or asynchronous transfer to the receiver 102a from the broadcaster 100 for playback via a multimedia system 106. Client capture device 104 may receive the time-shifted content or replayed content from the DVR or on-demand, streamed, or downloaded content, and may decode closed captioning data and transmit the decoded data to an audience measurement server, provided line 21 or EIA-708 captioning is implemented. Accordingly, in such implementations, audiences for non-real-time broadcasts may be measured via the same systems as measurements of live broadcasts.

As shown, in some implementations, a measurement system may include a database or storage device 114 storing closed captioning data, referred to generally as a closed captioning database 114. Closed captioning data for the database 114 may be received from the measurement service capture device 110, or may be received directly from a broadcaster 100. For example, in one implementation, closed captioning data may be intercepted before encoding in the video signal and/or decoded via a monitoring output at a broadcast site or studio, and may be transmitted via a network 108 for storage in a closed captioning database 114. In a similar implementation, closed captioning data may be provided in non-real-time from the broadcaster 100 for inclusion in a closed captioning database 114. For example, the broadcaster 100 may separately provide text or data files of closed captioning data to be embedded in a video signal during broadcast of a movie or television program, sometimes hours, days, or weeks in advance of broadcast. Similarly, the broadcaster 100 may provide text or data files of closed captioning data for one or more items of content in a VOD library. When a user subsequently requests an item of content from the VOD library and closed captioning data is decoded and transmitted by a client capture device 104 to an audience measurement server 112, the received data may be matched to the text or data files previously received from the broadcaster and stored in database 114.

Although shown separate from audience measurement server 112, in many implementations, closed captioning data 114 may be part of the audience measurement server 112 or maintained by the audience measurement server 112. Accordingly, in such implementations, the audience measurement server 112 may receive closed captioning data from broadcaster(s) 100 and/or measurement service capture device(s) 110 and may store the data in the closed captioning database 114.

Closed captioning database 114 may comprise a relational database, flat file, data file, or any other type and form of database. In some implementations, closed captioning text may be stored in the database 114 as text. In other implementations, a portion of closed captioning text (e.g. a number of words or characters, such as 5 words, 8 words, 10 words, 50 words, or any other such value; an amount of data in a number of video fields, such as closed captioning data from one video field, 10 video fields, or any other such value; or an amount of data within a predetermined period of time, such as closed captioning data embedded within 5 seconds of video, 10 seconds of video, or any other such value) may be hashed or used as an input to a hashing algorithm, with the result entered into the database or used as an index to an entry in the database. Closed captioning database 114 may also include an identification of an item of content associated with the closed captioning data or portion of the closed captioning data. For example, in implementations in which closed captioning data is received in non-real-time from a broadcaster, the data may be explicitly identified as associated with an item of content. In other implementations in which closed captioning data is received via a receiver 102b and decoded by a measurement service capture device 110, the data may be associated with an item of content based on a broadcast schedule, embedded metadata, or other such information. In still other implementations, the data may be associated with a channel and broadcast time that the content was received by a receiver 102b, and may be subsequently associated with the item of content based on a broadcast schedule, such as during a subsequent step of audience measurement.

The measurement server 112 may receive closed captioning data or a hash of the data from a client capture device 104 and compare the received data to the database 114 of closed captioning data to identify matches. In implementations in which closed captioning data is received and the database stores closed captioning text directly, the measurement server 112 may use a search algorithm for a text string including the received text. In implementations in which the captioning data is hashed or stored in hashed form in the database, as discussed above, the measurement server 112 may determine if an entry exists in the database at an index identified by the hash calculation value, such that existence of such entry (with an associated identification of a content) indicates that the received data from client capture device 104 matches data received from a measurement service capture device 110 or from a broadcaster 100. Responsive to a match, the measurement server 112 may determine that the item of content was received and played by receiver 102a to a multimedia system 106, and presumably was watched by the panel participant; accordingly, the measurement server 112 may identify the participant as an audience member of the item of content.

In implementations in which a hash is calculated from a string of closed captioning data, a sliding window may be used to calculate hashes of closed captioning data for inclusion in the database or for comparison of closed captioning data received from a client capture device 104. For example, if the database is populated via hashes of strings of closed captioning data twenty words in length, then in some implementations, a comparison of a hash of received data from word number five to word number twenty-five may not match a hash of data from word one to word twenty. Accordingly, in such implementations, a sliding window (e.g. 1-20, 2-21, 3-22, etc.) may be used either for comparing hashes of received data from client capture device 104 or for populating the database 114. Window length may be chosen to reliably identify an item of content, with larger windows having greater uniqueness, but requiring more data to create a match. To further increase uniqueness of closed captioning strings associated with content, older content or closed captioning data may be removed from the database. For example, many broadcast programs are presented daily or weekly (e.g. nightly newscasts or episodic sitcoms with identical introductions, etc.). Closed captioning data from these programs may be removed from the database 114 after a corresponding time period of a day or week, eliminating the possibility of data received from a client capture device 104 matching both a current presentation and a previous presentation of the same program.

In other implementations, closed captioning data received from a client capture device 104 may be compared to closed captioning data in a database 114 for a "best", but not perfect match. For example, strings of closed captioning data may be compared to find strings that match above a predetermined threshold, such as 50%, 75%, 90% or any other value. Depending on the threshold and string length, this may eliminate the need for a sliding window comparison or allow for a large slide in a window (e.g. windows that overlap by 50%, such as strings of words 1-20, 11-31, 21-41, etc.), as matching closed captioning strings will always match at a rate above the threshold, even if they do not start with the same word or character. With particularly long windows or string lengths, longer than typical commercial breaks, matches may be detected if a program is the same, even if interstitial or local advertising received by the client capture device 104 is different.

Figure 2A:
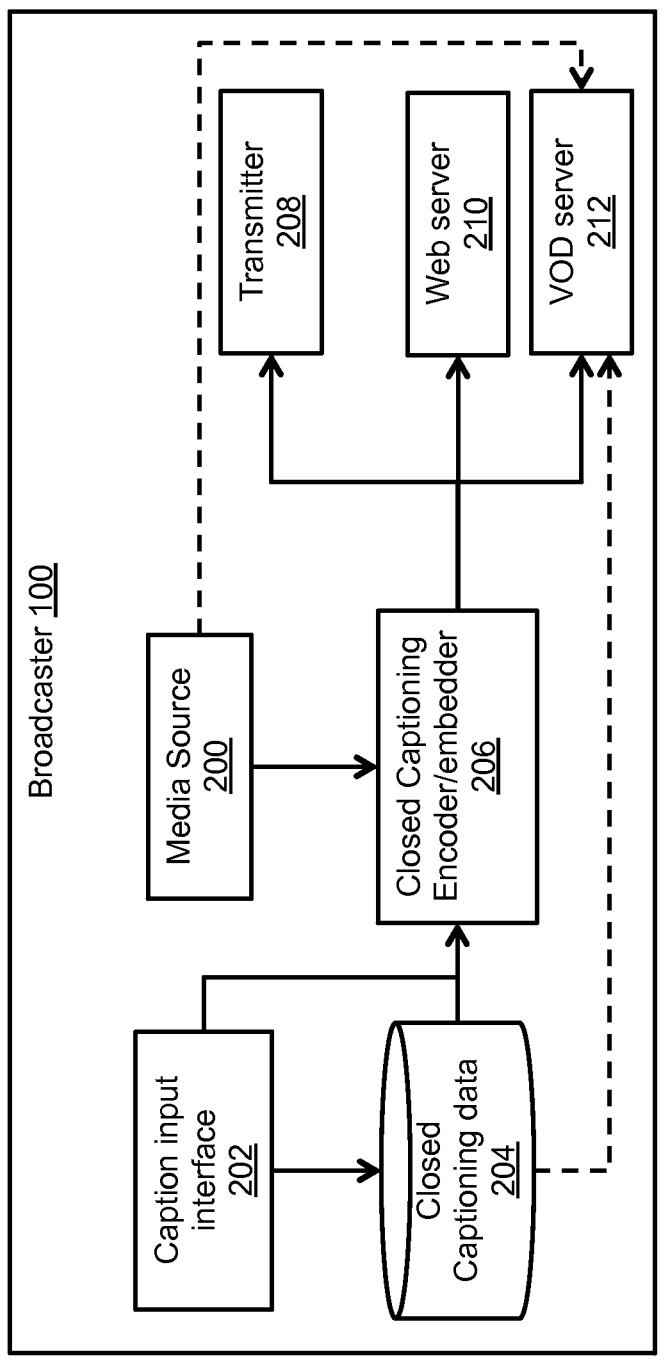
FIG. 2A is a block diagram of a broadcast provider system, according to one implementation.

FIG. 2A is a block diagram of a broadcast provider system, according to one implementation. As shown, a broadcaster 100 may include one or more media sources 200. Although only one media source is illustrated, it may be readily appreciated that typical broadcasters 100 may include multiple studios, media play out sources, satellite downlinks, or other equipment, which may be mixed or selected via a mixer, router, switch, or other interface and provided to a closed captioning encoder or embedder 206, referred to generally as an encoder 206.

As discussed above, encoders 206 may receive closed captioning data from one or more sources, such as a caption input interface 202 and/or a closed captioning data file 204, and may encode or embed the data in EIA-608 and/or EIA-708 format or other similar formats. Closed captioning may be inserted for live programming, such as live sports or news broadcast events via input interfaces 202 (e.g. computing devices, keyboards, text-to-speech converters, etc.); or may be provided by program producers or third-party services for pre-recorded content, such as movies or television programs. Closed captioning data files 204 may be sent to an encoder 206 via automation or other systems for synchronized embedding during playback for on-air broadcasting.

In some implementations, output of an encoder 206 may be provided to a transmitter 208, such as a satellite transmitter, terrestrial transmitter, microwave transmitter, or cable modulator; may be provided to a web server 210 for streamed broadcasting; and/or may be provided to a VOD server 212 for transfer to a client responsive to a request. In some implementations, media content from a source 200 and closed captioning data 204 may be provided separately to a VOD server 212, without embedding, or for embedding via a client-side interface.

Figure 2B:
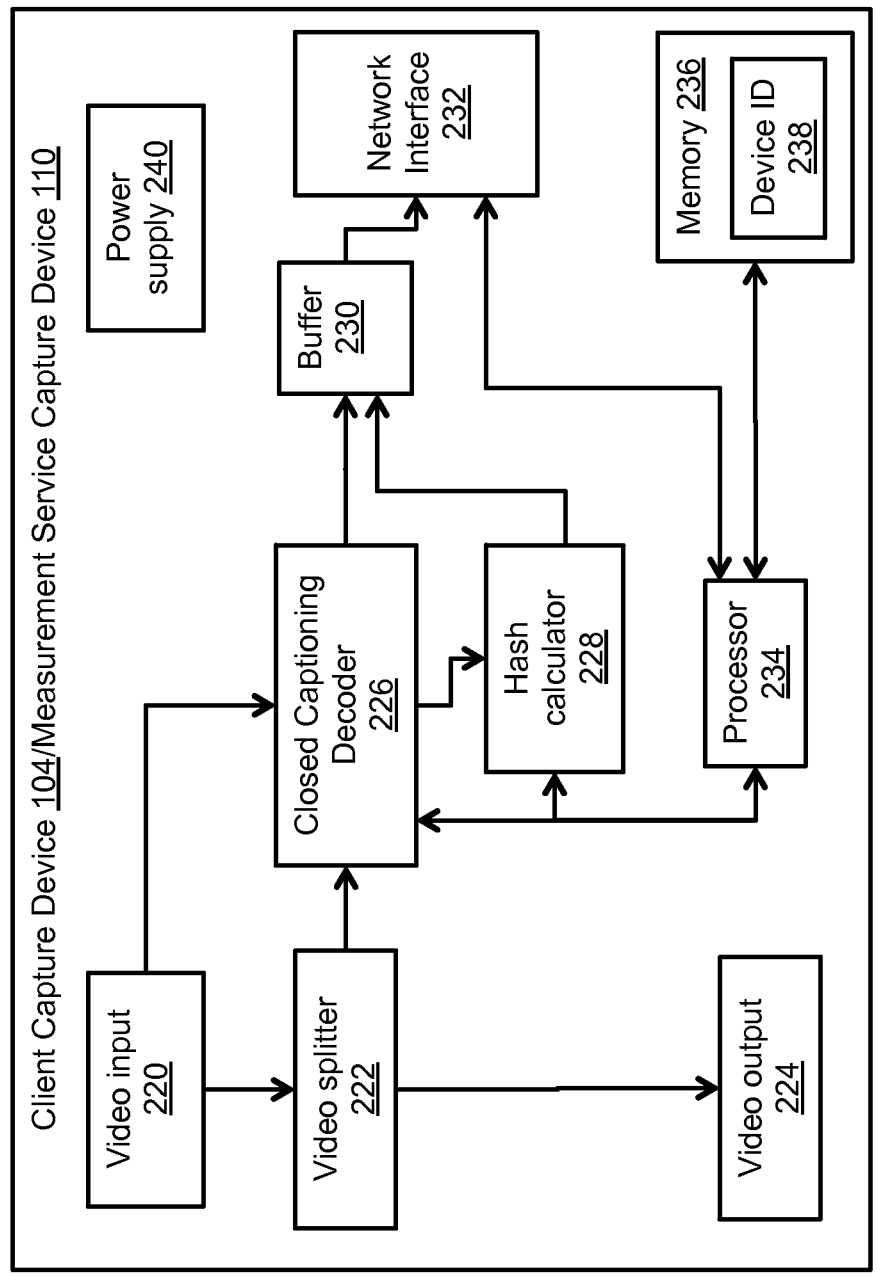
FIG. 2B is a block diagram of a closed captioning capture device, according to one implementation.

FIG. 2B is a block diagram of a closed captioning capture device, such as a client capture device 104 or measurement service capture device 110, according to one implementation. A capture device 104, 110 may include a video input 220. Video input 220 may be any type and form of video input, including an analog composite or component video input, a baseband or RF video input, a digital video input, or any other type of input. In some implementations, a client capture device 104, 110 may include a video splitter 222 and a video output 224. For example, in many implementations, a client capture device 104 may be configured for installation as an intermediary device between a video output of a receiver and a video input of a television. Accordingly, the client capture device 104 may include a video input 220 for connection to the receiver, video splitter 222 for splitting the input signal for processing by a closed captioning decoder 226, and video output 224 for connection to the television. In other implementations, such as for deployment at a measurement service at which a television may not be required, the capture device may not include a video splitter 222 and video output 224.

The output of video input 220 or video splitter 222 may be provided to a closed captioning decoder 226, referred to generally as a decoder 226. Decoder 226 may comprise hardware, software, or a combination of hardware and software. For example, in one implementation, decoder 226 may comprise a CMOS integrated circuit (IC), such as a MC 144144 series IC manufactured by Motorola Inc. of Schaumburg, Ill. or an equivalent IC; a programmable IC or field-programmable gate array (FPGA); or any other type and form of circuit or combination of circuits. In another implementation, the capture device 104, 110 may include a processor 234 and memory device 236, and may execute a software decoder 226, which may read a digital input or output of an analog-to-digital converter connected to video input 220.

Decoder 226 may output one or more strings of closed captioning data. For example, EIA-608 allows for four channels of information. In some implementations, decoder 226 may output a plurality of these channels, while in other implementations, decoder 226 may output a single channel or be selectively set to output a single channel. Similarly, EIA-708 allows for 63 channels plus two backwards-compatible EIA-608 channels, and decoder 226 may be set to output one or more of the embedded channels.

In some implementations, a hash calculator 228. Hash calculator 228 may comprise hardware, software, or a combination of hardware and software for performing a hashing calculation on a string of output data from closed captioning decoder 226. For example, hash calculator 228 may comprise an IC, PIC, FPGA, or other hardware programmed to perform a cryptographic or non-cryptographic hashing function, such as a message-digest algorithm (MD) hash (e.g. MD2, MD4, MD5, MD6, etc.), secure hash algorithm (SHA) hash, or any other type and form of hashing function. In other implementations, a hash calculator 228 may comprise a software algorithm, stored in memory 236 and executed by a processor 234 on an output of a decoder 226. As discussed above, a hash calculator 228 may perform a hashing calculation on any number of characters or words, and may utilize a sliding window to perform hashing calculations on overlapping data sets output from a decoder 226.

In some implementations, an output of decoder 226 and/or hash calculator 228 may be buffered in a buffer 230, such as a First-in/First-out (FIFO) buffer, ring buffer, or similar memory structure. As a single field of closed captioning data may be just a few words or characters, it may be more efficient to collect a few kilobytes or more of closed captioning data and/or hash calculation results before transmitting data over a network. Accordingly, in such implementations, data may be buffered in buffer 230 for a predetermined period of time or a predetermined amount of data may be buffered for subsequent transmission.

In some implementations, an output of a buffer 230, and/or decoder 226 or hash calculator 228, may be transmitted or streamed via a network interface 232 to an audience measurement server. A network interface 232 may comprise any type and form of network interface, including a wired interface (e.g. Ethernet, including 10 Base T, 100 Base T, or 1000 Base T ("Gigabit")), a wireless interface (e.g. 802.11a, 802.11b, 802.11g, 802.11n, 802.11.ac, Bluetooth, Bluetooth Low Energy, Near-field Communication (NFC)), a cellular interface, or any other type of interface for transmitting data over a network. In some implementations, network interface 232 may comprise a parallel or serial interface, such as a USB interface, an IEEE 1394 (Firewire) interface, an RS-232 interface, an RS-485 interface, or any other type and form of interface to another computing device. In many implementations, a second computing device may serve as an intermediary for communications to an audience measurement server. For example, in one such implementation, a capture device may communicate via a USB interface with a desktop computer, which may transmit captured closed captioning data via an Ethernet interface to a network gateway or switch connected to the Internet for transmission to an audience measurement server. In such implementations, network interface 232 may be referred to as a communications interface. In some implementations, the capture device 104, 110 may store decoded and/or hashed data in a memory 236, for subsequent synchronization or transfer via a computing device connected to a network 108.

As discussed above, in many implementations, a capture device 104, 110 may include a processor 234. Processor 234 may comprise any type and form of processing unit, including a microprocessor, application-specific integrated circuit (ASIC), FPGA, etc., or combinations of these or other processing units. In many implementations, processor 234 may be a multi-core processor or an array of processors. A capture device 104, 110 may also include memory 236, which may include, but is not limited to, electronic, optical, magnetic, or any other storage devices capable of providing processor 234 with program instructions. Memory 236 may include a floppy disk, CD-ROM, DVD, magnetic disk, memory chip, ROM, RAM, EEPROM, EPROM, flash memory, optical media, or any other suitable memory from which processor 234 can read instructions and, in some implementations, to which processor 234 can write decoded or hashed closed captioning data for subsequent transmission via network interface 232. The instructions may include code from any suitable computer programming language such as, but not limited to, C, C++, C#, Java, JavaScript, Perl, HTML, XML, Python and Visual Basic.

In some implementations, a capture device 104, 110 may include a device identifier 238. Device identifier 238 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers, to identify the capture device 104, 110. In some implementations, the device identifier 238 may be fixed to the device or preconfigured in the device, such as a manufacturer serial number or MAC address, while in other implementations, the device identifier 238 may be dynamically set by a panel provider, by the audience measurement server, or other entity, such as via a cookie or username. In some implementations, a unique or new device identifier 238 may be set for each communication to the audience measurement server, while in other implementations, the device identifier 238 may not be changed, or may be changed periodically (e.g. hourly, daily, weekly, etc.) or at other intervals (e.g. on restart of the capture device, login to an internet service, etc.). Device identifier 238 may be transmitted to the audience measurement server before, with, or subsequent to a transfer of decoded and/or hashed closed captioning data, such that the data may be identified as having been captured by the device 104, 110. For example, in one embodiment, a capture device 104, 110 may log in or establish an authenticated session with an audience measurement server using the device identifier 238. In another embodiment, the capture device 104 may transmit closed captioning data in the body of a packet, with the device identifier included in the header of the packet. For example, closed captioning data may be transmitted via a representational state transfer (REST) protocol, hypertext transfer protocol (HTTP) request (e.g. a POST or GET request with captioning data as a parameter-value pair), or via any other such application, session, or presentation layer protocol. In other implementations, closed captioning data may be transmitted via an options field of a transport layer protocol packet header, such as a transport control protocol (TCP) or user datagram protocol (UDP) packet. In other implementations, closed captioning data may be provided as a serial bit stream.

In some implementations, a capture device 104, 110 may include a power supply 240. Power supply 240 may comprise a battery, AC power supply, DC power supply, USB power supply, Power-over-Ethernet (PoE) power supply, inductive power supply, or any other type and form of power supply. Although illustrated internal to a capture device 104, 110, in many implementations, a power supply 238 may be external from device 104, 110, such as an external AC-to-DC converter.

In many implementations, a capture device 104, 110 may be very small, such as only a few cubic inches in size or less. As many of the features of a capture device 104, 110 may be implemented with small integrated circuits, the capture device 104, 110 may be inexpensive to manufacture, and may be unobtrusive when installed in a panel participant's home or other viewing location.

Figure 2C:
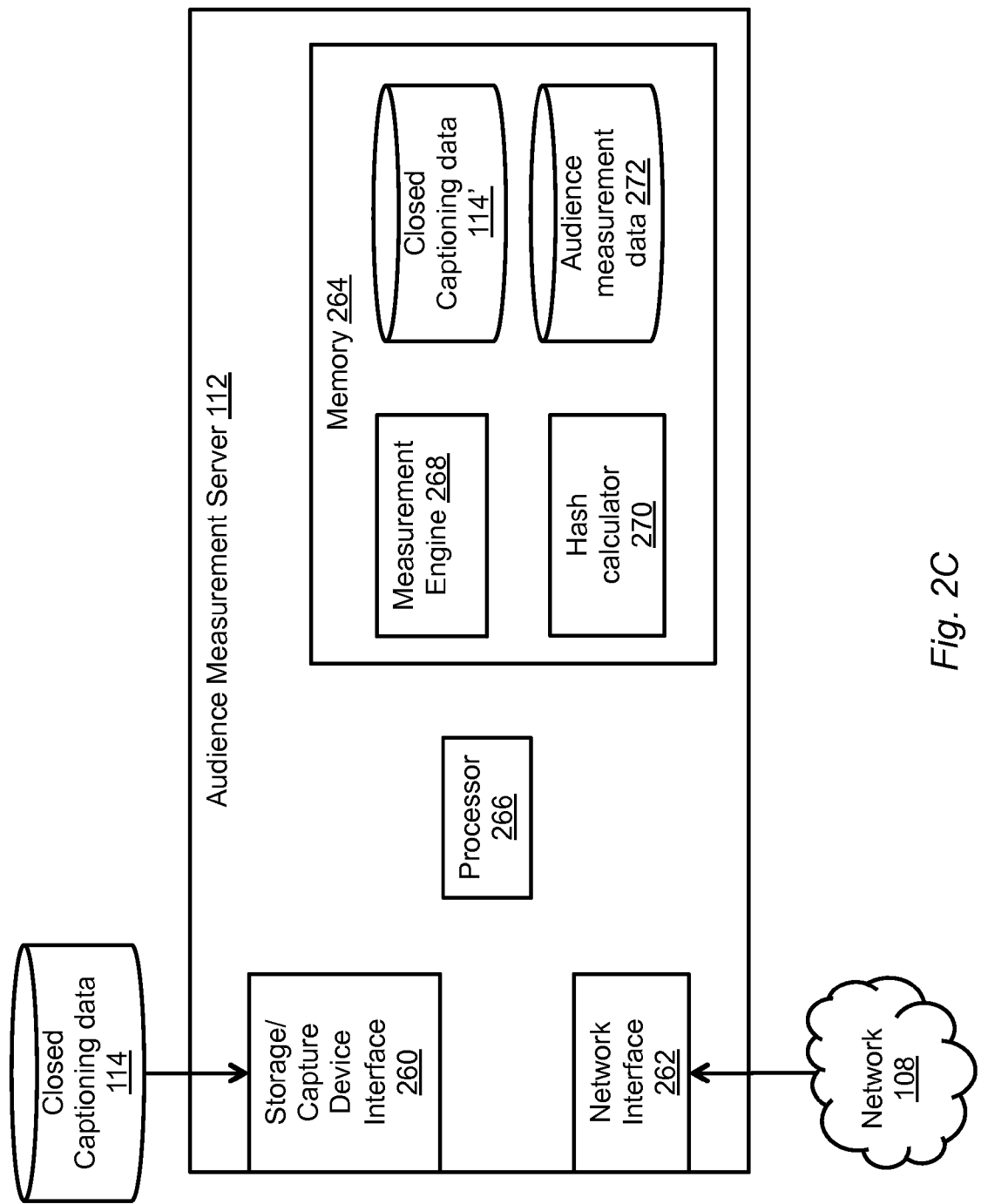
FIG. 2C is a block diagram of an audience measurement server, according to one implementation.

FIG. 2C is a block diagram of an audience measurement server 112, according to one implementation. In many implementations as discussed above, audience measurement server 112 may comprise a plurality of devices connected via a network, such as a server farm or cluster or a cloud of devices. In other implementations, one or more audience measurement servers 112 may comprise a virtual machine executed by a physical machine. Accordingly, in such implementations, audience measurement server 112 may comprise one or more of each of interfaces, memory, and processors 260-266.

An audience measurement server 112 may include one or more storage device or capture device interfaces 260, and one or more network interfaces 262. As discussed above, in many implementations, a capture device 104, 110 may communicate with an audience measurement server 112 via a network 108 to a network interface 262. Network interface 262 may comprise any type and form of network interface, such as a wired interface (e.g. Ethernet), a wireless interface (e.g. 802.11a, 802.11b, 802.11g, 802.11n, 802.11.ac, Bluetooth, Bluetooth Low Energy, NFC interface, etc.), a cellular interface, or any other type of interface for receiving data from capture devices 104, 110.

In many implementations, as discussed above, an audience measurement server 112 may be deployed locally to an audience measurement capture device 110. In such implementations, the capture device may connect via a network interface 262, or via a capture device interface 260, including a parallel or serial interface, such as a USB interface, an IEEE 1394 (Firewire) interface, an RS-232 interface, an RS-485 interface, or any other type and form of interface. In many implementations, an audience measurement server 112 may connect to one or more storage devices, such as hard drives, flash drives, redundant arrays of independent disks (RAID arrays), network attached storage (NAS) devices, storage area network (SAN) devices, or any other type and form of storage. Such storage devices may store closed captioning data 114, as discussed above, received from one or more broadcasters 100, one or more audience measurement capture devices 110, or other data. For example, a storage device may store audience measurement data 272, discussed in more detail below.

An audience measurement server 112 may include one or more processors 266, including one or more microprocessors, ASIC circuits, FPGAs, etc., or combinations of these or other processing units. In many implementations, processor 266 may be a multi-core processor or an array of processors. In other implementations, a processor 266 may comprise a virtual processor executed by a physical processor. Processor 266 may be configured for executing a measurement engine 268 and/or hash calculator 270, as well as for communicating with capture devices 104, 110 and/or storage devices via network interface 262 and capture device interface 260.

An audience measurement server 112 may also include memory 264, which may include, but is not limited to, electronic, optical, magnetic, or any other storage devices capable of providing processor 266 with program instructions. Memory 264 may include a floppy disk, CD-ROM, DVD, magnetic disk, memory chip, ROM, RAM, EEPROM, EPROM, flash memory, optical media, or any other suitable memory from which processor 266 can read instructions and to which processor 266 can write data. As shown, in some implementations, a closed captioning database 114' may be stored in memory 264 rather than an external storage device.

Memory 264 may include a measurement engine 268. Measurement engine 268 may comprise an application, service, server, daemon, routine, subroutine, or other executable logic for comparing closed captioning data or an identifier of closed captioning data such as a hash result received from one or more client capture devices with closed captioning data received by a measurement capture device and/or stored in a closed captioning database 114, 114'.

Measurement engine 268 may execute one or more matching or comparison functions, such as a search function, a lookup function, or any other such function. In some implementations, a measurement engine 268 may maintain an audience measurement database 272. Audience measurement database 272 may comprise any type and form of database, including a data file, flat file, relational database, structured database, etc. for storing identifications of content and/or broadcast channels and time periods and a corresponding set of device identifiers of client capture devices 104 that captured closed captioning data matched to corresponding data for the content captured by measurement capture device 110 or received from broadcasters 100. A measurement engine 268 may count unique device identifiers associated in the database 272 with an item of content to determine an audience measurement for the content.

Figure 3:
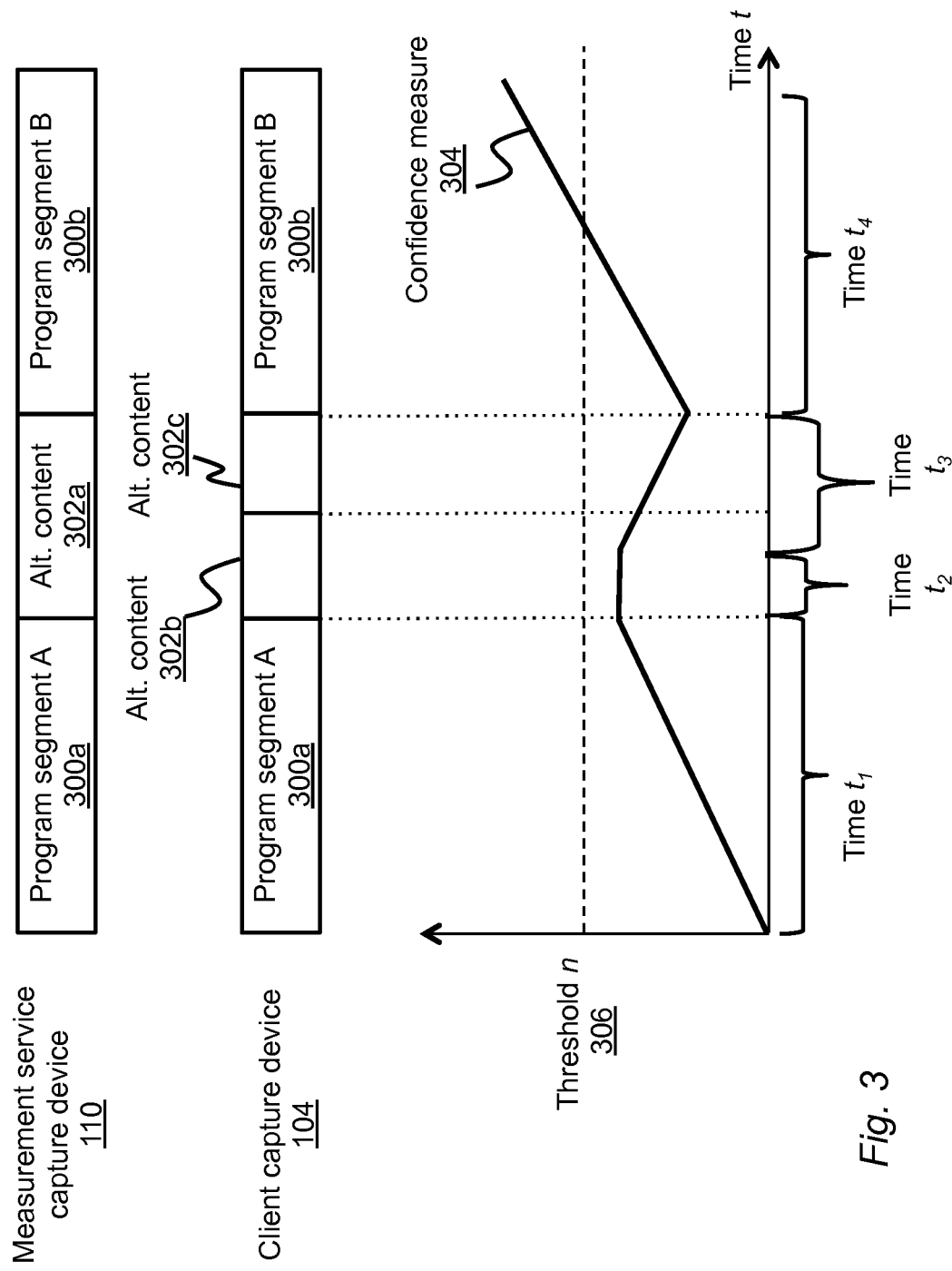
FIG. 3 is a diagram illustrating comparison of captured closed captioning data and generation of a confidence measurement for inclusion of a device in an audience measurement, according to one implementation.

In some implementations, an audience measurement database 272 may store confidence scores of matches of each device identifier to an item of content. In such implementations, device identifiers having low confidence scores may be removed or excluded from the audience measurement count. FIG. 3 is a diagram illustrating comparison of captured closed captioning data and generation of a confidence measurement for inclusion of a device in an audience measurement, according to one implementation. In some implementations, a measurement service capture device 110 may capture closed captioning data embedded in a television program, such as a program 300 having segments 300a and 300b. The capture device 110 may also capture closed captioning data embedded in interstitial alternative content 302a, such as advertising, program promotions, breaking newscasts, or other such content. This closed captioning data may be associated by an audience measurement server with program 300 and content 302a based on a broadcast schedule or metadata received from a broadcaster 100.

A client capture device 104 may also receive video for the broadcast program 300, but may receive different alternative content. For example, as discussed above, the measurement service capture device 110 may receive a national network feed from the broadcaster, while the client capture device 104 may receive a local affiliate feed with local advertising, weather, news, etc. Closed captioning data captured by the client capture device 104 may be identical or highly similar to captioning data captured by the measurement service capture device 110 during program segments A 300a and B 300b, but may be different during alternative content segments 302b-302c.

For live audience measurements, it may be useful to determine the number of panel participants (or capture devices) that are receiving a particular program at a specific time, but to prevent false positives from panel participants who quickly flip through different channels to determine what to watch, captured data may be filtered using a confidence measure 304. The confidence measure 304 may increase for each matched segment of closed captioning data during a program and may decrease for unmatched segments. For example, as shown in the graph of FIG. 3, the audience measurement server may increase confidence measure 304 throughout time $t_1$, during which closed captioning data captured by capture device 104 matches that captured by capture device 110 (or received from a broadcaster 100 for the program 300). During times $t_2$ and $t_3$, the audience measurement server may decrease confidence measure 304 due to matching closed captioning data not being identified. Through time $t_4$, the audience measurement server may again increase the confidence measure 304 as matches are identified. Once the confidence measurement 304 exceeds a threshold n 306, the audience measurement server may increment an audience counter for the program and/or add a device identifier of the client capture device 104 to a confirmed audience list for the program. Although discussed in terms of television program segments and interstitial advertising, typically around 10 minutes and 3 minutes in length respectively, times $t_{1-4}$ may be of any duration. For example, a program segment may refer to a two minute news segment during a broadcast, or an act of a movie. Rates of confidence measure 604 increase and decrease, and threshold n 306 may be configured to confirm audience membership based on any desired cumulative viewing time.

As shown, in some implementations, an audience measurement server may apply hysteresis or pause for a predetermined time period before decreasing a confidence measure 304, e.g. at time $t_2$. This may allow for temporary differences in closed captioning content that do not indicate that the panel participant is viewing a different program (e.g. emergency alert system (EAS) alerts or tests broadcast by a local affiliate during a national feed of a program, short station identifiers, etc.). If no matches are identified by expiration of the predetermined time period (e.g. expiration of a timer set to the time period, etc.), then the audience measurement server may begin decrementing the confidence measure 304.

Figure 4A:
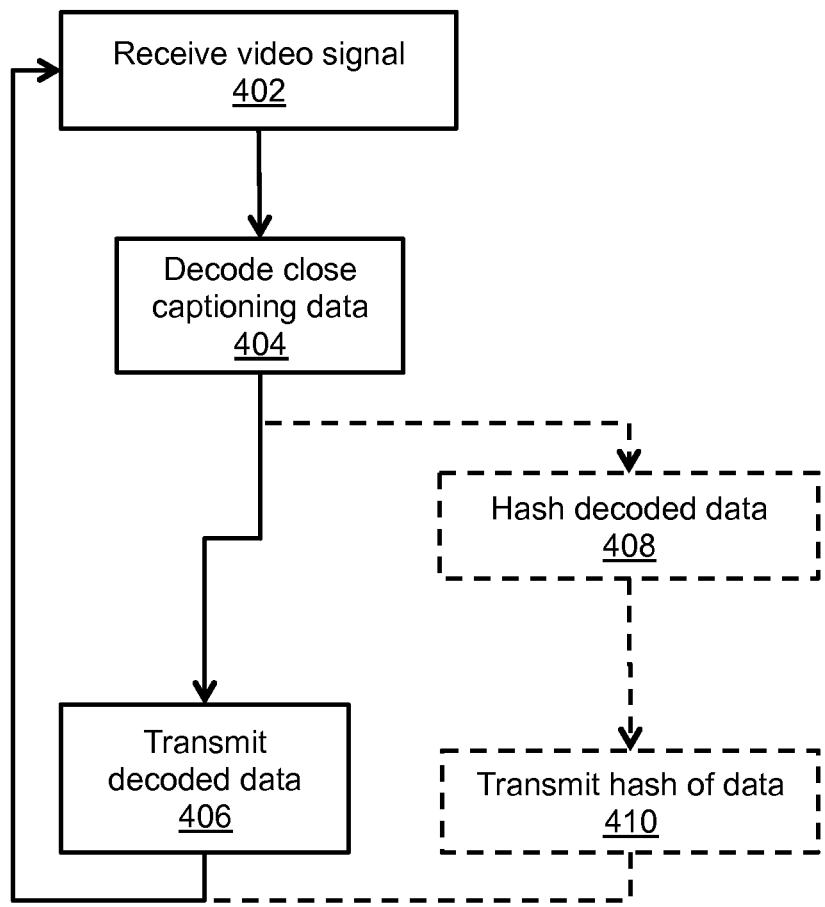
FIG. 4A is a flow diagram of the steps taken in one implementation of a process for capturing closed captioning data by a client device, according to one implementation.

FIG. 4A is a flow diagram of the steps taken in one implementation of a process 400 for capturing closed captioning data by a capture device, according to one implementation. In brief overview, a capture device may receive a video signal at step 402. At step 404, the capture device may decode closed captioning data embedded in the video signal. At step 406, the capture device may transmit the closed captioning data to an audience measurement server. In some implementations, at step 408, the capture device may calculate a hash of the closed captioning data or a portion of the data, and at step 410, may transmit the hash result to the audience measurement server.

Still referring to FIG. 4A and in more detail, at step 402, a capture device, such as a client capture device or a measurement service capture device, may receive a video signal. The capture device may receive a signal from a receiver, such as a receiver connected at a panel participant's home or other viewing location or at a measurement service data center or office, or may receive a video signal from a switcher, monitoring output, or other source at a broadcast studio, transmitter site, or other such location. The video signal may comprise an analog (NTSC) or digital (ATSC) signal, a phase alternating line (PAL) video signal, a sequential color with memory (SECAM) signal, a digital video broadcasting (DVB) signal, or any other type and form of signal having one or more channels of embedded closed captioning data, such as data in an EIA-608 and/or EIA-708 format. The capture device may receive the signal via an input port, such as a composite, component, RF baseband, HDMI, or other video input interface, and, in some implementations, may split the signal to a closed captioning decoder and simultaneous output interface for connection to a recorder, television, or other device.

At step 404, the capture device may decode the closed captioning data in the video signal. In some implementations, the capture device may decode a plurality of channels or strings of data, such as a first channel for a first language and second channel for a second language, while in other implementations, the capture device may decode only a first, default or predetermined channel. In some implementations, the capture device may decode only text data, while in other implementations, the capture device may decode command data (e.g. font, style, or color options, placement options, etc.). Such command data may further provide unique data to improve matching.

At step 406, in some implementations, the capture device may transmit the decoded closed captioning data to an audience measurement server. In many implementations, the capture device may collect a predetermined amount of closed captioning data and may transmit the data periodically, such as via a FIFO buffer or ring buffer or any other type of buffer, as discussed above. Periodic transmissions may be based on a time period, such as five seconds, ten seconds, one minute, or any other such period; or may be based on collection of a set amount of data, such as 1 kilobyte, 5 kilobytes, 30 kilobytes, etc. In some implementations, transmission frequency may be dynamically set responsive to network conditions. For example, higher frequencies may be set for low latency, high bandwidth connections to a measurement server, such as those on a Local Area Network (LAN), while lower frequencies may be set for high latency, low bandwidth, or heavily congested connections. Transmission of the data may be via any suitable protocol, such as a RESTful application layer protocol such as via HTTP parameter-value messages, a simple mail transfer protocol (SMTP), a file transfer protocol, or any other such protocol; via raw data encapsulated in a transport layer protocol such as TCP or UDP packet or network layer protocol such as IP; or via any other such protocol. In many implementations, the protocol may be a lossless protocol; however, in other implementations, particularly utilizing dynamic confidence measurements discussed above, a lossy protocol may be used to reduce overhead. To avoid dropped packets resulting in lower confidence measurements, hysteresis time periods may be configured to allow at least one subsequent transmission to be received before a measurement is decreased.

In some implementations, transmission of decoded data at step 406 may include transmission of a device identifier of the capture device. As discussed above, the device identifier may be provided with the decoded data, such as in an options field of a packet header, as a cookie, in a session identifier, as a parameter-value pair, or any other such means. In other implementations, the device identifier may log in or authenticate itself to the audience measurement server before transmitting decoded data. For example, the capture device may establish an authenticated session with an audience measurement server, and identify itself with its device identifier, before sending decoded data; or may connect to an audience measurement server or authentication server with its device identifier and may receive a cookie for use in subsequent data transfers. In still other implementations, log in and/or authentication may be provided by another device, such as an Internet gateway deployed as an intermediary between the capture device and audience measurement server.

In some implementations, decoded closed captioning data may be hashed at step 408. The capture device may perform any type and form of hashing algorithm on the closed captioning data, including a cryptographic or non-cryptographic hashing algorithm, or one substantially free of hash collisions. In other implementations, particularly with dynamic confidence measures as discussed above, a hashing algorithm with some collisions may be acceptable, provided collisions result in a low level of false positive matches. Hash results may be transmitted to the audience measurement server at step 410, using any of the methods discussed above in connection with step 406. As discussed above, in many implementations, the hash results may be buffered for a predetermined time period or size of data collected prior to transmission.

Figure 4B:
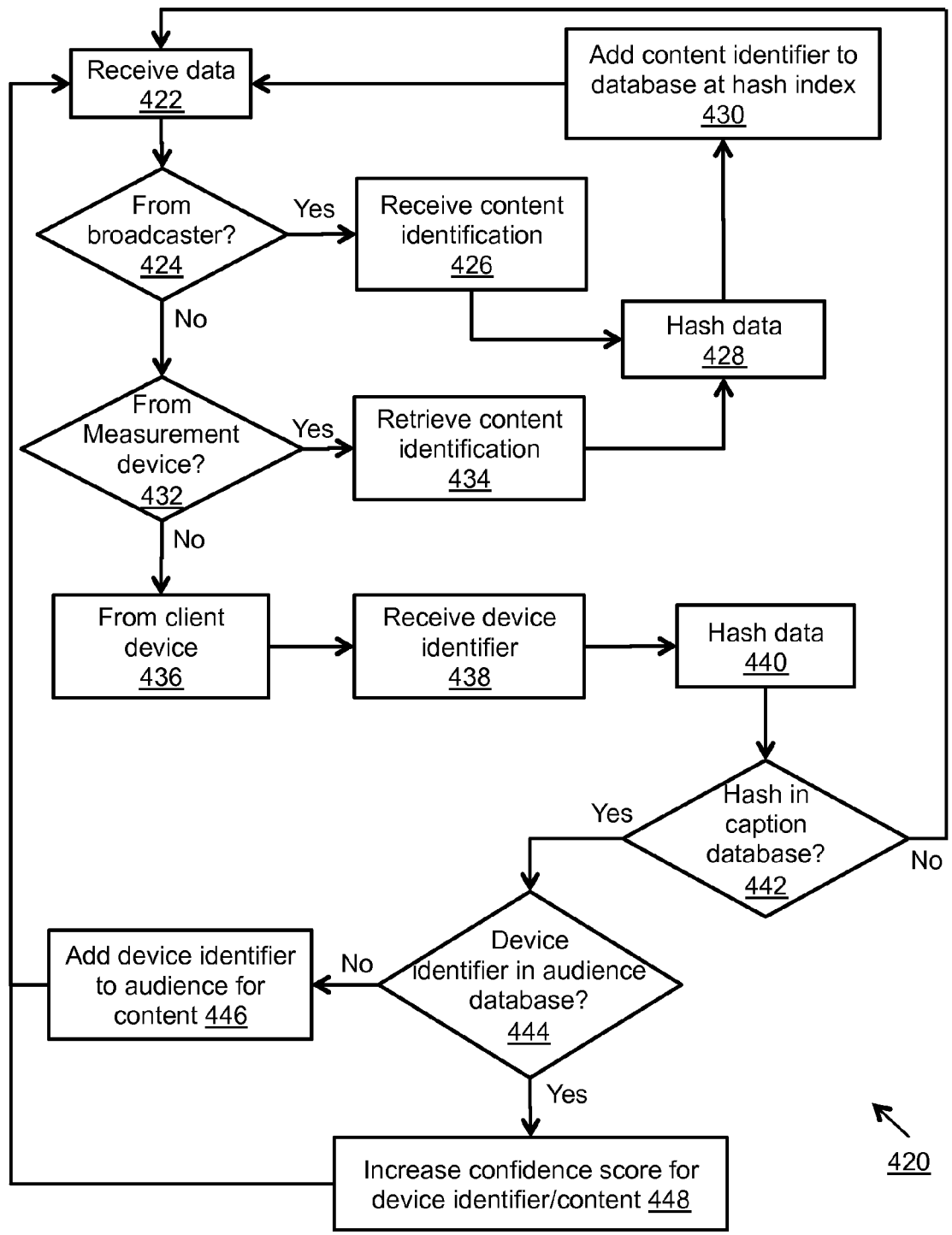
FIG. 4B is a flow diagram of the steps taken in one implementation of a process for matching received closed captioning data by an audience measurement server, according to one implementation.

FIG. 4B is a flow diagram of the steps taken in one implementation of a process 420 for matching received closed captioning data by an audience measurement server, according to one implementation. At step 422, the audience measurement server or a measurement engine of an audience measurement server may receive closed captioning data, or, in some implementations, a hash of such data. As discussed above, the audience measurement server may receive data via an application layer protocol such as a RESTful protocol, or any other protocol. For example, in some implementations, the audience measurement server may receive closed captioning data from a broadcaster or other data provider as data file, such as a single data file for a television program or movie. In other implementations, as discussed above, the audience measurement server may receive the data from a capture device, in smaller amounts such as around a few kilobytes of data or data representing a few minutes of a program.

At step 424, the audience measurement engine may determine if the data was received from a broadcaster or service provider, such as via a file transfer. If so, then the data may include a content identification in metadata, such as a file header, file name, or other data field. The content identification may identify the source of the content, the content type, a name of the content, a day or time of day of broadcast of the content, or any combination of these or other information. At step 426, the audience measurement engine may receive the content identification and/or extract the content identification from the received data. The audience measurement engine may determine that the data was received from the broadcaster or service provider responsive to the inclusion or presence of the metadata, responsive to a method of receipt (e.g. file transfer via a network, attachment via email, etc.), or responsive to other such indicators (e.g. data file size being above a threshold equivalent to a maximum buffer size in a capture device, etc.).

At step 428, in some implementations, the audience measurement engine may calculate a hash of the received closed captioning data or a portion of the data. For example, the measurement engine may select a window of data, such as 20 words, 120 characters, 150 bytes, 500 bytes, or any other size window of closed captioning data, and may calculate a hash value of the data. The hash result may be used as an index to a closed captioning database and the content identifier may be stored at the corresponding database entry at step 430. In some implementations, a sliding window algorithm may be used and overlapping portions of closed captioning data may be hashed. For example, the measurement engine may receive a large closed captioning data set from the broadcaster or service provider. In some such implementations, the measurement engine may break the received set up into a plurality of portions or windows for separate hashing and indexing, such as windows of 10 words, 20 words, 100 bytes, etc. In such implementations, steps 428-430 may be repeated iteratively for each successive window or portion until all of the received data is hashed and indexed.

In still other implementations, the closed captioning data may be used as the index value directly; in such implementations, step 428 may be skipped. The closed captioning data may still be broken up or apportioned into a plurality of shorter windows for subsequent comparison. In yet still other implementations, the closed captioning data may be stored as a data file or array associated with the content identification, and may be searched directly for data matching received phrases in subsequent matching steps. Accordingly, in such implementations, step 430 may be skipped.

If the closed captioning data is not received from the broadcaster or service provider, then at step 432, the measurement engine may determine if the data is received from an audience measurement service capture device. The measurement engine may determine that the measurement service capture device is the source responsive to a device identifier received with the closed captioning data corresponding to a known device identifier of the capture device, via the connection type (e.g. a serial connection over USB rather than a TCP connection via the Internet), or any other such means. Responsive to identifying the measurement service capture device as the source of the closed captioning data, the measurement engine may retrieve a corresponding content identification at step 434. The content identification may be retrieved from a broadcast schedule, such as published television listings for a channel monitored by the capture device. In other implementations, the measurement engine may transmit a request to a broadcaster for an identification of currently playing content, and may receive a corresponding content identification. As discussed above, the received closed captioning data may, in some implementations, be hashed at step 428 and/or may be added to a closed captioning database. In some implementations, such as where a broadcaster has previously provided closed captioning data for a program and the measurement capture device receives identical closed captioning data, the measurement engine may confirm that the content identification associated with each set of data is identical. If the content identifications are identical, the measurement engine may discard the latter set of data. If the identifications are not identical, the measurement engine may replace an earlier-received content identification with a later-received content identification to update the closed captioning database with new information.

In many implementations and as discussed above, the measurement engine may receive a large closed captioning data set from the measurement capture device. In some such implementations, the measurement engine may break the received set up into a plurality of portions or windows for separate hashing and indexing, such as windows of 10 words, 20 words, 100 bytes, etc. In such implementations, steps 428-430 may be repeated iteratively for each successive window or portion until all of the received data is hashed and indexed.

If closed captioning data was not received from a broadcaster or measurement capture device, then at step 436, it may be determined that the data was received from a client device. In some implementations, the measurement engine may receive a device identifier of the client device at step 438. As discussed above, the device identifier may be received with the closed captioning data, prior to receipt of the closed captioning data (e.g. during an authentication, session establishment, or login process), or subsequent to receipt of the closed captioning data.

At step 440, in some implementations, the measurement engine may calculate a hash of the received closed captioning data or a portion of the data. At step 442, the measurement engine may determine if a content identifier exists at a corresponding hash index value entry in the closed captioning database. If no entry exists, then an identical set of closed captioning data or a portion of the data has not been previously received by the measurement engine (at least within a time period before removal of old entries from the closed captioning database, as discussed above), and the hash result may be discarded.

In many implementations, a sliding window algorithm may be used and steps 440-442 may be iteratively repeated for each new position of the window until a match is identified. In a further implementation, the sliding window algorithm may only need to be performed in a first round of iterations for received closed captioning data. For example, if a set of closed captioning data from a client capture device is identical to a set of data received from a measurement device, but starting five words later, then steps 440-442 may need to be repeated only five times, advancing the window one word at a time, until a match is identified. For example, given a window length of 20 words, windows may be compared of words 1-20, 2-21, 3-22, 4-23, 5-24, and 6-25, at which point a match may be identified. Once a match is identified, then to identify additional matching data within the received data set, the window may be advanced by its full length: e.g. matching words 6-25, then 26-45, 46-65, etc. Thus, once synchronized, confirmation of matching of large identical closed captioning data sets may be performed very quickly.

In other implementations, as discussed above, closed captioning data may be used as the index of the closed captioning database directly, and accordingly, may not need to be hashed. In such implementations, step 440 may be skipped. Step 442 may still be repeated, as discussed above, for iterations of a sliding window algorithm on subsequent portions of the closed captioning data without hashing.

When a match is identified, then at step 444, the measurement engine may identify an associated item of content and determine if the device identifier of the client device is in an audience database entry for the item of content. As discussed above, each entry in the closed captioning database may include a corresponding identification of content added at step 430. Accordingly, when the measurement engine looks up an index entry corresponding to a hash or portion of the data, if an entry exists and a match is found, then the measurement engine may simply retrieve the associated content identifier. Each content identifier may also be associated with an audience database or array of device identifiers of devices identified as having received the corresponding content. Upon identifying a match at step 442, at step 444, the measurement engine may determine if the device identifier of the client device exists within the array or database for the associated content identifier. If the device identifier does not exist within the array, then at step 446, the measurement engine may add the device identifier to the array or database. In a further implementation, the measurement engine may add a default or starting confidence score for the device identifier being part of the audience to the array. If the device identifier does exist within the array, then the device has previously been identified as having received the content; accordingly, in some implementations, at step 448, the measurement engine may increase a confidence score for the device identifier in the array associated with the content.

In a similar implementation, the measurement engine may maintain a database or array of content associated with a device identifier, in addition to or instead of a database or array of device identifiers associated with an item of content. For example, rather than maintaining a list or array of devices identified as being part of the audience for a particular show, the measurement engine may maintain a list or array of shows identified as having been received by a particular device. In some such implementations, the measurement engine may subsequently search through a plurality of arrays associated with devices for a content identifier of an item of content, to determine how many devices were part of the audience. In a similar implementation, the arrays may be provided to a third party, such as a panel provider, for analysis and/or audience measurement.

As discussed above, in implementations in which the measurement engine receives a large closed captioning data set from the client capture device and breaks the received set up into a plurality of portions or windows for separate hashing and indexing, steps 440-448 may be repeated iteratively for each successive window or portion until all of the received data is hashed and indexed.

As discussed above, in some implementations, the measurement engine may decrease a confidence score for a client device identifier and previously matched item of content if a match is not identified at step 442 in a subsequent iteration. For example, in one such implementation, the measurement engine may retain an identification of a device identifier and a previously matched item of content. The measurement engine may retain the identification for a predetermined period of time, such as a minute, five minutes, an hour, or any other such period. Responsive to determining that a portion of closed captioning data received from the client does not match any entries in the closed captioning database, the measurement engine may decrement a confidence score associated with the client device identifier in an audience array for the item of content. In some implementations, the confidence score may be decreased at a slower rate than it was increased at step 448 (e.g. the confidence score may be incremented by two points per match but decremented by one point per non-match, or any other such values). In other implementations, as discussed above, the measurement engine may not decrease the confidence score until a predetermined period of time has passed since the last matched closed captioning data, such as 15 seconds, 30 seconds, 1 minute, or any other such value. This may provide hysteresis for short local content in an otherwise identical broadcast program.

Figure 4C:
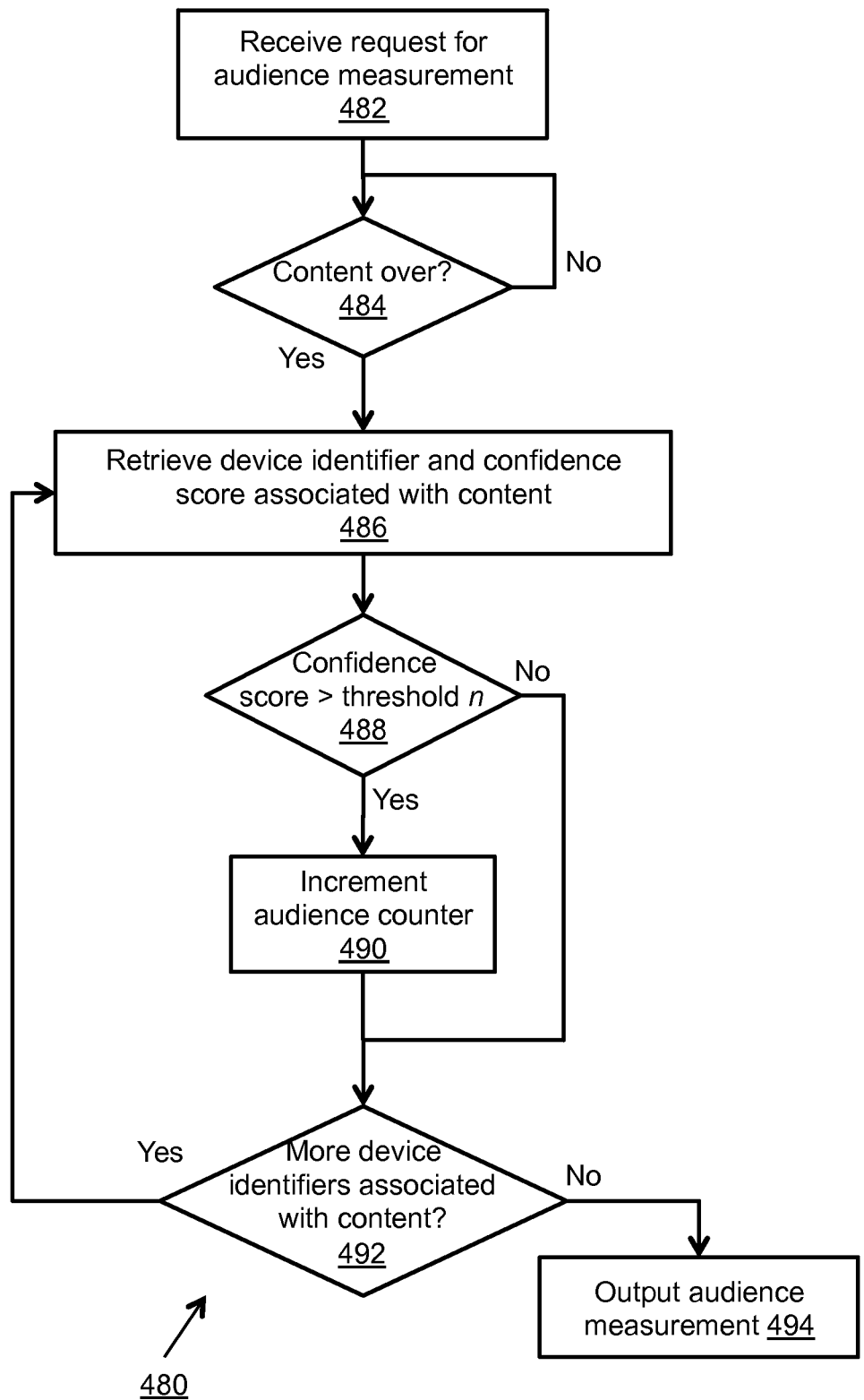
FIG. 4C is a flow diagram of the steps taken in one implementation of a process for measuring an audience of an item of content by an audience measurement server, according to one implementation.

In some implementations, audience measurement may be performed in real time, incrementing a counter for each device identifier added to an audience array for an item of content and decrementing the counter (and possibly removing a device identifier) responsive to a confidence measure for the device identifier falling below a threshold. In other implementations, audience measurement may be performed responsive to a request for an audience measurement, or responsive to the end of an item of content being broadcast. FIG. 4C is a flow diagram of the steps taken in one implementation of a process 480 for measuring an audience of an item of content by an audience measurement server, according to one implementation. At step 482, the measurement engine may receive a request for an audience measurement for an item of content. The request may be received from a broadcaster, advertiser, producer, panel provider, marketer, analyst, or other entity. The request may identify one or more items of content, and, in some implementations, may include a confidence measure threshold to utilize for the measurement.

At step 484, in some implementations, the measurement engine may determine if the item of content is still be broadcast or is over. If the content is still being broadcast, then in some implementations, the measurement engine may wait and repeat step 484 until the item of content is over. The measurement engine may determine that the item of content is still being broadcast based on a published broadcast schedule, responsive to metadata received from a broadcaster including program start and end times, or based on other similar information. In other implementations, step 484 may be skipped, for example, for live audience measurements during a program.

At step 486, the measurement engine may retrieve a first device identifier, and, in some implementations, a confidence score or measure associated with the device identifier, from an audience array or database for the item of content. At step 488, in some implementations, the measurement engine may determine if the confidence score is above a threshold n, such as a predetermined threshold or a threshold received at step 482. If the confidence score is greater than the threshold n, then at step 490, an audience counter for the item of content may be incremented. If the confidence score is less than the threshold, then step 490 may be skipped. At step 492, the audience measurement engine may repeat steps 486-492 for each additional device identifier in the audience array, until a total audience measurement for the item of content is generated. In implementations not utilizing a confidence score, step 488 may be skipped and the audience counter may be a direct count of the number of device identifiers in the audience array. At step 494, the audience measurement may be output or provided as a response to the request for audience measurement.

Closed captioning databases, and audience measurement databases or arrays may be periodically purged. For example, device identifiers and confidence scores may be removed from an audience array after a program is complete and a measurement is generated. In other implementations, the device identifiers and confidence scores may be removed from the array after an hour, a day, a week, or any other amount of time. This may allow for aggregation of audience measurements including live audiences as well as audience members who record and time-shift the program for later watching. Closed captioning databases may also be purged with entries removed after a predetermined amount of time, such as prior to a next episode of a program, or simply periodically.

As the systems and methods discussed herein utilize a capture device installed in series or parallel with a panel participant's television, such panel participants must typically sign up or agree to participate in data collection. As only device identifiers and closed captioning data are transmitted from client capture devices, privacy and anonymity of panel participants may be protected. To further enhance privacy, in some implementations, the device identifiers and/or closed captioning data may be encrypted for transmission to the audience measurement server. Panel participants may also stop transmitting measurement data by removing a video input, network connection, and/or power connection from the capture device, and may resume at any time by reattaching said connection or connections.

In some implementations, the panel participant may be provided with an opportunity to control whether or how to transmit measurement data to the audience measurement server. For example, the client capture device may be configured to be disabled during certain times of day or with certain program material (e.g. specified channels, or responsive to the presence of specified V-chip parental rating codes embedded within the video). Thus, the panel participant may have control over how information is collected about him or her and used by the audience measurement servers, panel providers, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for audience measurement, comprising:
receiving, by an audience measurement engine executed by a processor of a first device, from a remote device, a first identification of closed captioning data received by the remote device during playback of an item of content;
matching, by the audience measurement engine, the first identification of closed captioning data received by the remote device to a second identification of closed captioning data stored in a database in a storage device of the first device;
retrieving, by the audience measurement engine, an identification of the item of content associated in the database with the second identification of closed captioning data, responsive to the match;
associating, by the audience measurement engine, a device identifier of the remote device with the identified item of content;
receiving, by the audience measurement engine from the remote device, a third identification of closed captioning data received by the remote device during playback of the item of content;
matching, by the audience measurement engine, the third identification of closed captioning data received by the remote device to a fourth identification of closed captioning data stored in the database;
retrieving, by the audience measurement engine, the identification of the item of content associated in the database with the fourth identification of closed captioning data, responsive to the match;
determining, by the audience measurement engine, that the device identifier of the remote device is included in an audience list of the identified item of content;
increasing, by the audience measurement engine, a value of a confidence metric associated with the device identifier of the remote device in the audience list of the identified item of content; and
incrementing, by the audience measurement engine, an audience measurement counter for the item of content for each device identifier included in the audience list of the identified item of content having a confidence metric value greater than a threshold.

2. The method of claim 1, wherein associating the device identifier of the remote device with the identified item of content further comprises added the device identifier to an audience list of the identified item of content.

3. The method of claim 1, wherein the first identification of closed captioning data comprises closed captioning text or a hash of closed captioning text.

4. The method of claim 1, further comprising:
receiving, by the audience measurement engine, a second identification of closed captioning data received by a second device; and
adding the second identification of closed captioning data to the database.

5. The method of claim 4, wherein the second device is operated on behalf of the audience measurement engine.

6. The method of claim 4, further comprising receiving an identification of the item of content, associated with the second identification of closed captioning data; and adding the identification of the item of content to the database with the second identification of closed captioning data.

7. The method of claim 1, wherein matching the first identification of closed captioning data received by the remote device and the second identification of closed captioning data stored in the database comprises:
  calculating a result of a hash function of the first identification of closed captioning data; and
  identifying, within the database, an entry identifying an item of content at an index corresponding to the calculated hash function result, the index equal to a result of a hash function of the second identification of closed captioning data.

8. The method of claim 1, further comprising:
  decreasing, by the audience measurement engine, the value of the confidence metric associated with the device identifier of the remote device in the audience list of the identified item of content, responsive to not matching an identification of closed captioning data received by the remote device to a corresponding identification of closed captioning data associated with the item of content stored in the database within a predetermined time period.

9. A system for audience measurement, comprising:
  a capture device, comprising a video input, a closed captioning decoder connected to the video input, and a first network interface for transmitting a first identification of closed captioning data received by the capture device during playback of an item of content to an audience measurement server; and
  an audience measurement server comprising a processor executing a measurement engine, and a second network interface for receiving the identification of closed captioning data;
  wherein the measurement engine is configured for:
    matching the first identification of closed captioning data received by the capture device to a second identification of closed captioning data stored in a database in a storage device of the audience measurement server,
    retrieving an identification of the item of content associated in the database with the second identification of closed captioning data, responsive to the match,
    associating a device identifier of the capture device with an audience list of the identified item of content,
    receiving, from the capture device, a third identification of closed captioning data received by the remote device during playback of the item of content,
    matching the third identification of closed captioning data received by the capture device to a fourth identification of closed captioning data stored in the database,
    retrieving the identification of the item of content associated in the database with the fourth identification of closed captioning data, responsive to the match,
    determining that the device identifier of the capture device is included in an audience list of the identified item of content,
    increasing a value of a confidence metric associated with the device identifier of the capture device in the audience list of the identified item of content, and
    incrementing an audience measurement counter for the item of content for each device identifier included in the audience list of the identified item of content having a confidence metric value greater than a threshold.

10. The system of claim 9, wherein the measurement engine is further configured for adding a device identifier of the capture device to an audience list of the identified item of content.

11. The system of claim 9, wherein the first identification of closed captioning data comprises closed captioning text or a hash of closed captioning text.

12. The system of claim 9, wherein the measurement engine is further configured for:
  receiving a second identification of closed captioning data received by a second capture device; and
  adding the second identification of closed captioning data to the database.

13. The system of claim 12, wherein the measurement engine is further configured for receiving an identification of the item of content, associated with the second identification of closed captioning data, and adding the identification of the item of content to the database with the second identification of closed captioning data.

14. The system of claim 12, wherein the measurement engine is further configured for calculating a result of a hash function of the first identification of closed captioning data, and identifying, within the database, an entry identifying an item of content at an index corresponding to the calculated hash function result, the index equal to a result of a hash function of the second identification of closed captioning data.

15. The system of claim 9, wherein the measurement engine is further configured for decreasing the value of the confidence metric associated with the device identifier of the capture device in the audience list of the identified item of content, responsive to not matching an identification of closed captioning data received by the capture device to a corresponding identification of closed captioning data associated with the item of content stored in the database within a predetermined time period.

16. A computer-readable storage medium storing instructions that when executed by one or more data processors, cause the one or more data processors to perform operations comprising:
  receiving, from a remote device, a first identification of closed captioning data received by the remote device during playback of an item of content;
  matching the first identification of closed captioning data received by the remote device to a second identification of closed captioning data stored in a database in a storage device;
  retrieving an identification of the item of content associated in the database with the second identification of closed captioning data, responsive to the match;
  associating a device identifier of the remote device with an audience list of the identified item of content;
  receiving, from the capture device, a third identification of closed captioning data received by the remote device during playback of the item of content;
  matching the third identification of closed captioning data received by the capture device to a fourth identification of closed captioning data stored in the database;
  retrieving the identification of the item of content associated in the database with the fourth identification of closed captioning data, responsive to the match;
  determining that the device identifier of the capture device is included in an audience list of the identified item of content;
  increasing a value of a confidence metric associated with the device identifier of the capture device in the audience list of the identified item of content; and incrementing an audience measurement counter for the item of content for each device identifier included in the audience list of the identified item of content having a confidence metric value greater than a threshold.

* * * * *